(12) United States Patent
Tian

(10) Patent No.: US 8,300,079 B2
(45) Date of Patent: Oct. 30, 2012

(54) APPARATUS AND METHOD FOR TRANSFERRING VIDEO

(75) Inventor: Rihui Tian, Beijng (CN)

(73) Assignees: Legend Holdings Ltd, Beijing (CN); Lenovo (Beijing) Limited, Beijing (CN)

( * ) Notice: Subject to any disclaimer, the term of this patent is extended or adjusted under 35 U.S.C. 154(b) by 1196 days.

(21) Appl. No.: 12/060,933

(22) Filed: Apr. 2, 2008

(65) Prior Publication Data

US 2008/0246835 A1  Oct. 9, 2008

(30) Foreign Application Priority Data

Apr. 3, 2007 (CN) .......................... 2007 1 0065102

(51) Int. Cl.
H04N 7/14 (2006.01)
(52) U.S. Cl. ............... 348/14.07; 348/14.01; 348/14.02; 348/14.03; 348/14.04; 348/14.05
(58) Field of Classification Search .... 348/14.01–14.05, 348/14.07, E7.079
See application file for complete search history.

(56) References Cited

U.S. PATENT DOCUMENTS

| | | | |
|---|---|---|---|
| 6,792,295 B1 * | 9/2004 | Hanevich et al. .......... | 455/569.1 |
| 6,965,413 B2 * | 11/2005 | Wada ............................ | 348/376 |
| 7,450,149 B2 * | 11/2008 | Drell et al. ................. | 348/14.08 |
| 7,555,312 B2 * | 6/2009 | Kim et al. ................... | 455/556.1 |
| 8,054,328 B2 * | 11/2011 | Shiue et al. ................ | 348/14.05 |
| 2006/0143314 A1 * | 6/2006 | Sinha et al. ........................ | 710/5 |
| 2007/0178944 A1 * | 8/2007 | Mitsuru et al. ............. | 455/569.1 |
| 2008/0055394 A1 * | 3/2008 | Shiue ........................ | 348/14.01 |

OTHER PUBLICATIONS

Xuheng Wangkai Zhuxiuchang; "Videophone Implementation based on TM1100 DSP"; Department of Information Engineering, Nanjing University of Posts and Telecommunications, Apr. 2000, pp. 61-64. (English translation of abstract and listed on p. 64 of document).
Yu Zhanwu, et al.; "A Design Model of ISDN Videophone and Its Implementation Politics"; Journal of Wuhan Technical University of Surveying and Mapping; vol. 24, No. 3, Sep. 1999, pp. 262-267. (English translation of abstract only and listed on p. 267 of document).

* cited by examiner

Primary Examiner — Curtis Kuntz
Assistant Examiner — Ryan Robinson
(74) Attorney, Agent, or Firm — Dickstein Shapiro LLP

(57) ABSTRACT

The present invention discloses a terminal for transferring video, comprising an audio-video splitting/assembling unit for assembling locally acquired video stream and audio stream, or splitting an audio-video assembly sent from a counter-terminal into video stream and audio stream; a device discovering unit responsible for searching for a first device with video capturing and displaying functions; wherein the audio-video splitting/assembling unit is adapted to receive a video stream of images captured by the first device after the device discovering unit has found the first device, and then to use the video stream for the local audio-video assembly, or the audio-video splitting/assembling unit is adapted to send the split video stream to the first device for video display. Obviously, since the counter-party's picture is transferred to the first device with a larger screen, the display effect is improved, and it is possible to bring the user a better visual experience without the limitation of the size of the video terminal screen. The present invention further provides a method for transferring video.

10 Claims, 6 Drawing Sheets

APPARATUS AND METHOD FOR TRANSFERRING VIDEO

BACKGROUND OF THE INVENTION

1. Field of Invention

The present invention relates to the field of the video phone technology, in particular to an apparatus with the function of transferring video and a method for transferring video.

2. Description of Prior Art

Video Phone is a key application in the 3G and the B3G network, in which the dominant terminals including mobile phones, PDA (Personal Digital Assistant) devices and handheld computers etc will support the video phone function. As the typical service embodying the 3G's advantages, video phone is similar to the current Internet video, in which both communication parties can see each other's session scene on the terminals' screens by means of the video phone function.

Referring to FIG. 1 that is a schematic diagram of the usage of the video phone: the user wishes not only to use the mobile phone's camera to photograph himself, but also to watch the counter-party's picture, and also to listen and speak, so that the user can only put the mobile phone far away from his ears and handhold it in the direct front while speaking into the microphone or the mobile phone, in order to enable the camera to capture his face, and to watch the counter-party's picture, simultaneously it is also required to equip with an earphone to transmit sound.

Therefore, there are following problems existing in the current video phones:

(1) The display of the counter-party's picture will suffer the limitation of the size of the mobile phone's screen, thus the display effect is not ideal;

(2) The self-photographing effect will suffer the limitation of the camera's pixel resolution;

(3) The usage manner doesn't accord with the user's conventional way in which the mobile phone is handhold close to the ears, and it is required to equip with the earphones, which is inconvenient.

SUMMARY OF THE INVENTION

In the light of the above, the present invention provides an apparatus and a method for transferring video, in order to address the problems above and to improve the video phone user experience.

To this end, the embodiments of the present invention implement the following technical schemes:

A terminal for transferring video comprises: an audio-video splitting/assembling unit for assembling locally acquired video stream and audio stream, or splitting an audio-video assembly sent by a counter-terminal into video stream and audio stream; a device discovering unit responsible for searching for a first device with image capturing and displaying functions, wherein the audio-video splitting/assembling unit is adapted to receive a video stream captured by the first device after the device discovering unit has found the first device, and then to use the video stream for the local audio-video assembly, or the audio-video splitting/assembling unit is adapted to send the split video stream to the first device for display.

The terminal further comprises: a remotely waking-up unit responsible for waking-up the first device, when the device discovering unit has found the first device but the audio-video splitting/assembling unit can not establish a connection to the first device.

The terminal further comprises: a calling management unit responsible for establishing a communication connection between the terminal and the counter-terminal, and also responsible for starting up the action of the device discovering unit.

The terminal further comprises: an audio encoding/decoding and packet assembling unit for performing audio stream transmission with the audio-video splitting/assembling unit, wherein the audio-video splitting/assembling unit obtains the video stream of the first device and the audio stream of the audio encoding/decoding and packet assembling unit, assembles the video stream with the audio stream, and sends it to the counter-terminal, or, the audio-video splitting/assembling unit splits the audio-video stream sent from the counter-terminal, and then sends the video stream and the audio stream to the first device and the audio encoding/decoding packet assembling unit respectively.

The first device is adapted to decode the video stream sent from the audio-video splitting/assembling unit, and to display the video stream; or to packet assemble the obtained image to generate the video stream, and then send it to the audio-video splitting/assembling unit.

The terminal includes video phone, personal digital assistant or handheld computer.

The first device is an independent device or an assembled device, including a computer with a digital camera, a digital TV with image capturing function or a digital video camera.

A method for transferring video, used in video communication between a local terminal and a counter-terminal, comprises the following steps of: searching for a first device with image capturing and displaying functions; receiving a local video stream of images obtained by the first device, and assembling the video stream with a pre-obtained audio stream for transmitting it to the counter-terminal, or splitting an audio-video stream sent from the counter-terminal, and then transmitting the split video, stream to the first device for image display.

After finding the first device, the method further comprises: waking-up the first device according to the remotely waking-up technology.

The remotely waking-up technology is a wireless or wire remotely waking-up technology.

The establishment of the communication connection to the first device or the video transmission to the first device is implemented over a short distance wireless network or a wire connection.

The searching for the first device is done by Intelligent Grouping and Resource Sharing (IGRS), Universal Plug and Play (UPNP) or Digital Living Network Alliance (DLAN) protocol.

The communication between the local terminal and the first device is implemented over a short distance wireless network or a wire connection.

The short distance wireless network is a Ultra-Wide Bandwidth (UWB) wireless network, a Wireless Fidelity (WiFi) network, a ZIGBee network or a Bluetooth™ network; the wire connection is a Universal Serial Bus connection or an IEEE 1394 connection.

The technical effects of the above technical schemes are as follows:

(1) Transferring the counter-party's image to the first device with the large screen will improve the display effect, bring the users better visual experience, and also efficiently address the problem that the image in the existing schemes suffers the limitation of the size of the video terminal's screen;

(2) It is possible to select any image capture device with a higher pixel resolution, in order to ensure that the counter-party can watch the images of high quality, since the users' images can be captured by means of the image capturing function of the dedicated first device without the limitation of the terminal camera's pixel resolution;

(3) As a result of the video stream transferring, the terminal is only responsible for the speech transmission, and the user can still employ the calling way in which the mobile phone is handheld near the ears without the earphones or microphones, which is very convenient;

(4) It is possible to carry out the mode switch once adding a transfer key on the video terminal, which can be easily compatible with the currently usage model; and it is not required to make any modification on the counter-terminal, this becomes very practical.

DETAILED DESCRIPTION OF THE PRESENTLY PREFERRED EMBODIMENTS

For the clarity of the present invention, it is firstly introduced the operating principle of the conventional video phone.

Figure 2:
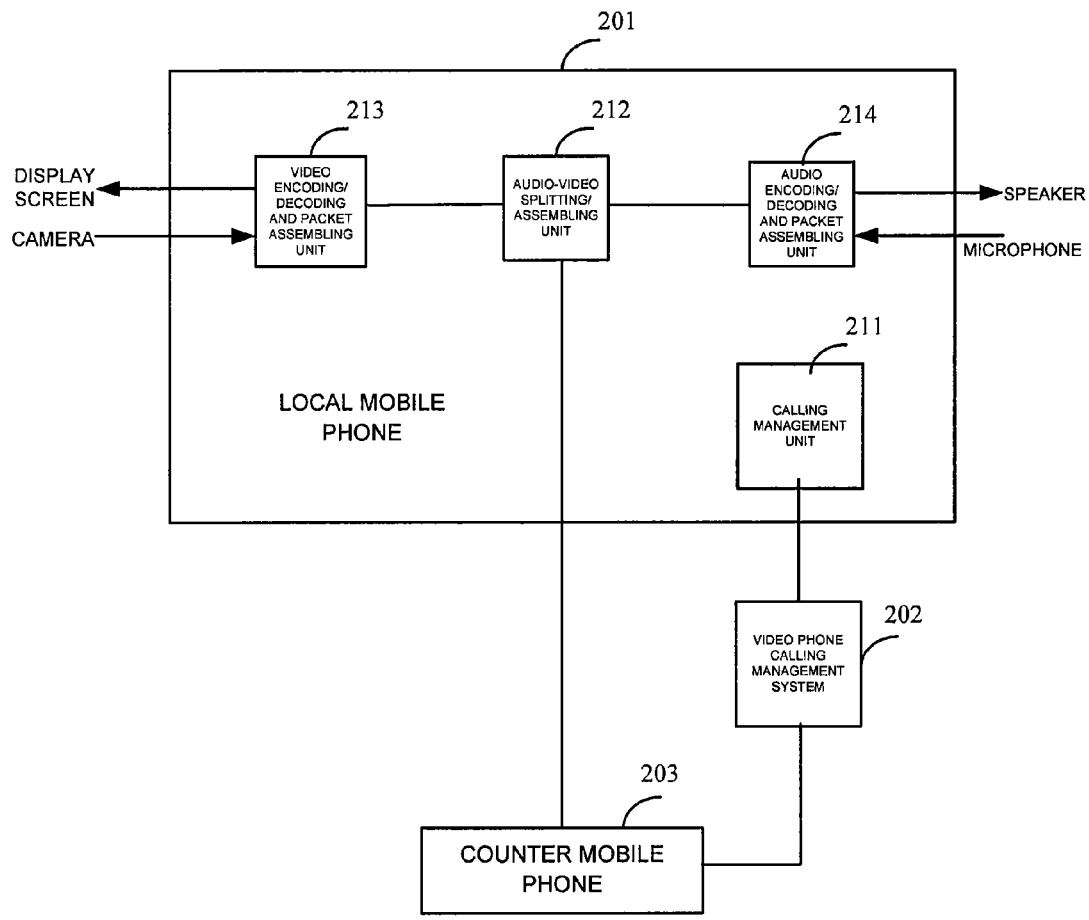
FIG. 2 is a systematic diagram of the conventional video phone.

Referring to FIG. 2, it is a systematic diagram of the conventional video phone.

In operations, a local mobile phone 201 establishes a connection to a counter mobile phone 203 by means of a video phone calling management system 202, and the audio-video transmission is carried out between an audio-video splitting/assembling unit 212 and the counter mobile phone 203. The local mobile phone 201 comprises a calling management unit 211, an audio-video splitting/assembling unit 212, a video encoding/decoding and packet assembling unit 213 and an audio encoding/decoding and packet assembling unit 214, by which implementing the video phone function.

In particular, the communication between the local mobile phone 201 and the counter mobile phone 203 comprises the following steps:

(A) The calling management unit 211 establishes a connection to the counter mobile phone 203 via the video phone calling management system 202 over a first network, when the local mobile phone 201 initiates a call or the local mobile phone 201 is called;

In which, the first network comprises Wireless Wide Area Network (WWAN) and Wireless Local Area Network (WLAN), which may support the transmission of the audio-video media stream for the video phone, the first network may be the 3G, the Worldwide Interoperability for Microwave Access (WiMAX), or the Wireless Fidelity (WiFi, that is 802.11b Standard) network; the transportation protocol may be the Real Time Transport Protocol (RTP), the Real-time Transport Control Protocol (RTCP), etc.

The video phone calling management system 202 may be based on the H.323, the Session Initiation Protocol (SIP) or the IP Multimedia Subsystem (IMS) protocol families; it may be a management system based on the first network managed by the operators, also it may be a management system based on the Intranet inside the enterprises.

(B) The counter-party transmits to the local party:

The counter mobile phone 203 transmits the audio-video information to the audio-video splitting/assembling unit 212 of the local mobile phone 201, the audio-video splitting/assembling unit 212 splits the received audio-video into the audio stream and the video stream, and then sends them to the audio encoding/decoding and packet assembling unit 214 and the video encoding/decoding and packet assembling unit 213 respectively;

The audio encoding/decoding and packet assembling unit 214 decodes the audio stream, then transmits it to the user's ears through the speaker (via the earphones) of the local mobile phone 201; simultaneously the video encoding/decoding and packet assembling unit 213 decodes the video stream, and then displays the decoded images to the user on the screen of the local mobile phone 201;

(C) The local party transmits to the counter-party:

The audio encoding/decoding and packet assembling unit 214 acquires sound from the microphone of the local mobile phone 201, encodes the sound to generate audio stream, and then sends the audio stream to the audio-video splitting/assembling unit 212; simultaneously the video encoding/decoding and packet assembling unit 213 acquires images from the camera of the local mobile phone 201, encodes the images to generate video stream, and then sends the video stream to the audio-video splitting/assembling unit 212;

The audio-video splitting/assembling unit 212 assembles the audio stream with video stream which are obtained from the audio encoding/decoding and packet assembling unit 214 and the video encoding/decoding and packet assembling unit 213 respectively, and then sends the assembled audio-video stream to the counter mobile phone 203.

By means of the above three steps, one audio-video transmission between the local party and the counter-party is completed.

Figure 1:
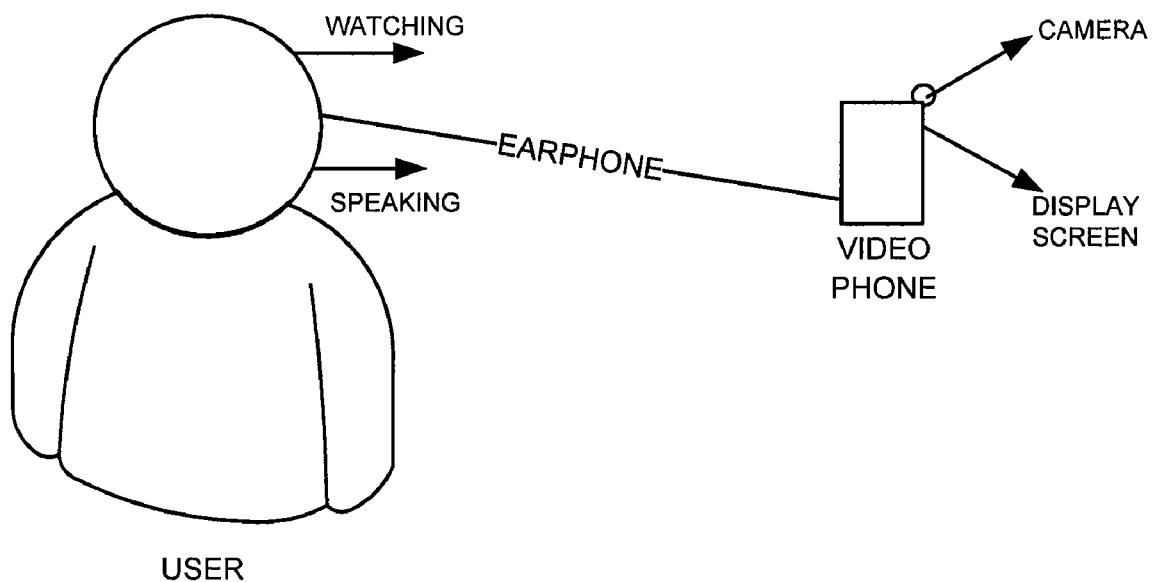
FIG. 1 is a schematic diagram of the usage of the conventional video phone

The conventional video phone solution has to implement the usage illustrated in FIG. 1, just as the above analysis, there are following disadvantages: the image display effect is not ideal; the usage is not convenient; and it is limited by the pixel resolution of the mobile phone's camera, and so on.

The present invention comes from the above problems to implement the video stream transferring based on the conventional video phone solution, whereby ensuring the good visual effect, simultaneously addressing the inconvenient usage and the like problems.

In general, the present invention firstly sets the video terminal to search for a first device, establishes a communication connection with the first device after successfully finding the first device, and then performs the video stream transmission with the first device.

The video terminal herein includes video phone, PDS device and handheld computer, etc.

The first device herein is a device with image displaying, image capturing and certain data processing capabilities, which may be a separate device, also may be an assembled device having a plurality of sub-devices, such as a Personal Computer (PC) with camera, a digital TV with the image capturing function, a digital video camera, and the like.

The video stream transmission with the first device comprises the data transmissions in two directions: the video terminal transmits the video stream to the first device for being displayed by the first device; the first device uses its image capturing function to capture an image, processes the image into the video stream and then sends the video stream to the video terminal, and thereafter the video terminal sends the video stream to the counter video terminal.

The below takes a case where a local mobile phone 201 is combined with a PC so as to implement the communication with the counter mobile phone 203 as an example to illustrate the implementation of the terminal according to a first embodiment of the present invention.

Figure 3:
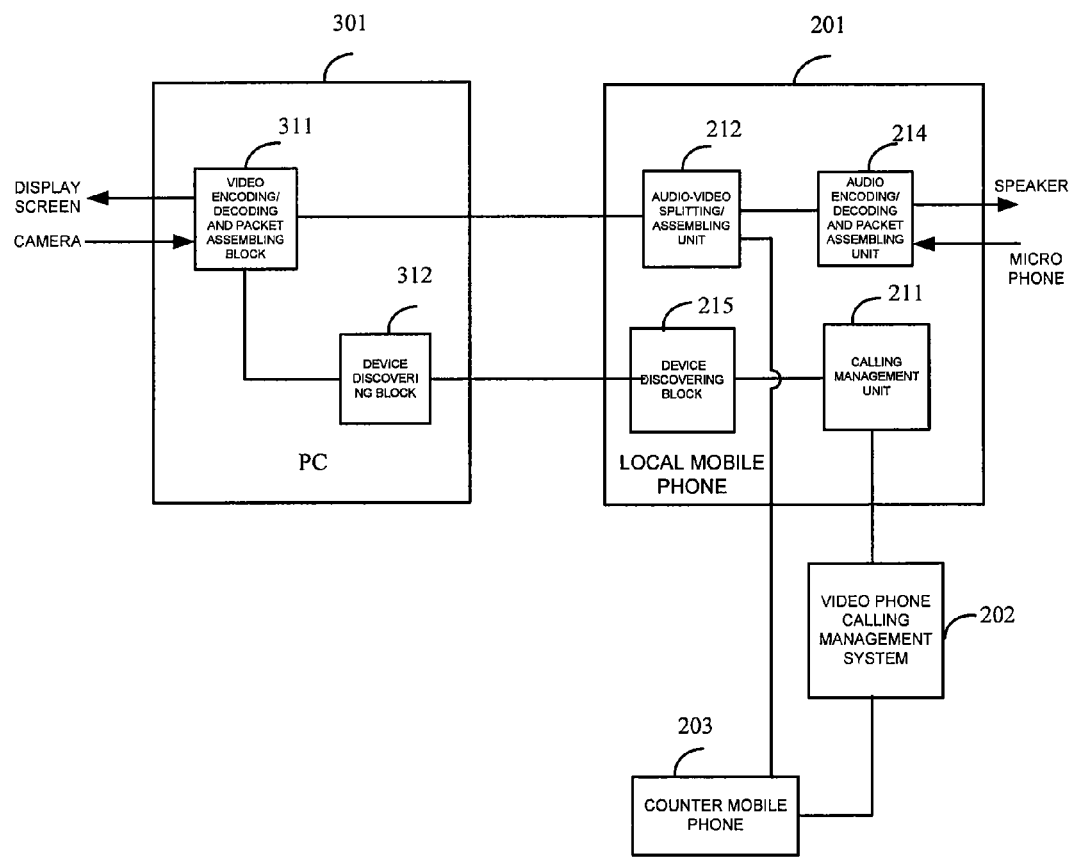
FIG. 3 is a systematic diagram of the terminal according to a first embodiment of the present invention.

Referring to FIG. 3, it is a systematic diagram of the terminal according to the first embodiment of the present invention.

For the local party, it comprises the local mobile phone 201 and the PC 302.

The local mobile phone 201 comprises a calling management unit 211, an audio-video splitting/assembling unit 212, an audio encoding/decoding and packet assembling unit 214 and a device discovering unit 312. The PC 302 comprises a video encoding/decoding and packet assembling block 311 and a device discovering block 312.

The local mobile, phone 201 still controls to establish a connection with the counter mobile phone 203 via the video phone calling management system 202 over the first network, and to perform the transmission of the audio-video stream with the counter mobile phone 203 via the audio-video splitting/assembling unit 212.

The differences lie in that the device discovering function is newly added into the local mobile phone 201, and that the image displaying and image capturing functions are transferred to the PC 302.

The local mobile phone 201 and the PC 302 will be described respectively as follows:

(1) Local Mobile Phone 201

Supporting a Second Network, Personal Area Network (PAN)

The second network may be, for example, the Ultra-Wide Bandwidth (UWB) wireless network, the WiFi network, the ZIGBee (ZigBee referring to the IEEE 802.15.4 standard) network and the Bluetooth network; it may also be the wire connection, such as the Universal Serial Bus connection (USB) or the IEEE1394 connection.

The second network is responsible for the short distance communication between the local mobile phone 201 and the PC 302, comprising the establishment of the communication connection and the transmission of the video stream after being connected.

Provided with the Device Discovering Function

It is possible to find the PC 302 over the second network, the device discovering protocol may employ Intelligent Grouping and Resource Sharing (IGRS), Universal Plug and Play (UPNP) or Digital Living Network Alliance (DLAN), and the like.

Provided with the Video Phone Calling Initiating and Managing Functions

The video phone's calling may be based on the H.323, SIP or IMS protocol families.

(2) PC 302

Supporting the Second Network, PAN

The second network may be the short distance wireless network, such as UWB, WiFi, ZigBee and Blue Tooth network; it may also be the wire connection, such as USB or 1393 connection.

Provided with the Device Discovering Function

It is possible to find the local mobile phone 201 over the second network, the device discovering protocol may employ IGRS, UPNP or DLNA, etc.

The main changing cases for the each unit in the local mobile phone 201 comprise:

The calling management unit 211 intensifies the management for the device discovering unit 215 on the basis of the conventional functions, that is the case in which the calling management unit 211 will enable the device discovering unit 215 to search for the device discovering block 312 of the PC 302 when the user enables the video transfer function, and then after the successful discovery, establish the communication connection over the second network;

The audio-video splitting/assembling unit 212 obtains the audio-video stream of the counter mobile phone 203, splits it to obtain the audio stream and the video stream, and then sends the video stream to the video encoding/decoding assembling block 311 of the PC 302 over the second network; and the video encoding/decoding assembling block 311 parses the images for being displayed to the user;

Alternatively, the video encoding/decoding assembling block 311 of the PC 302 encodes its obtained images to generate the video stream, and sends it to the audio-video splitting/assembling unit 212 of the local mobile phone 201, then the audio-video splitting/assembling unit 212 assembles the video stream with the audio stream provided by the audio encoding/decoding and packet assembling unit 214, and the assembly is sent to the counter mobile phone 203.

The second embodiment of the terminal will be described below:

On the basis of, the first embodiment, if the user needs to transfer the video, but the PC 302 is shut down, then it is possible to wake up the PC 302 by means of the remotely waking-up technology.

Figure 4:
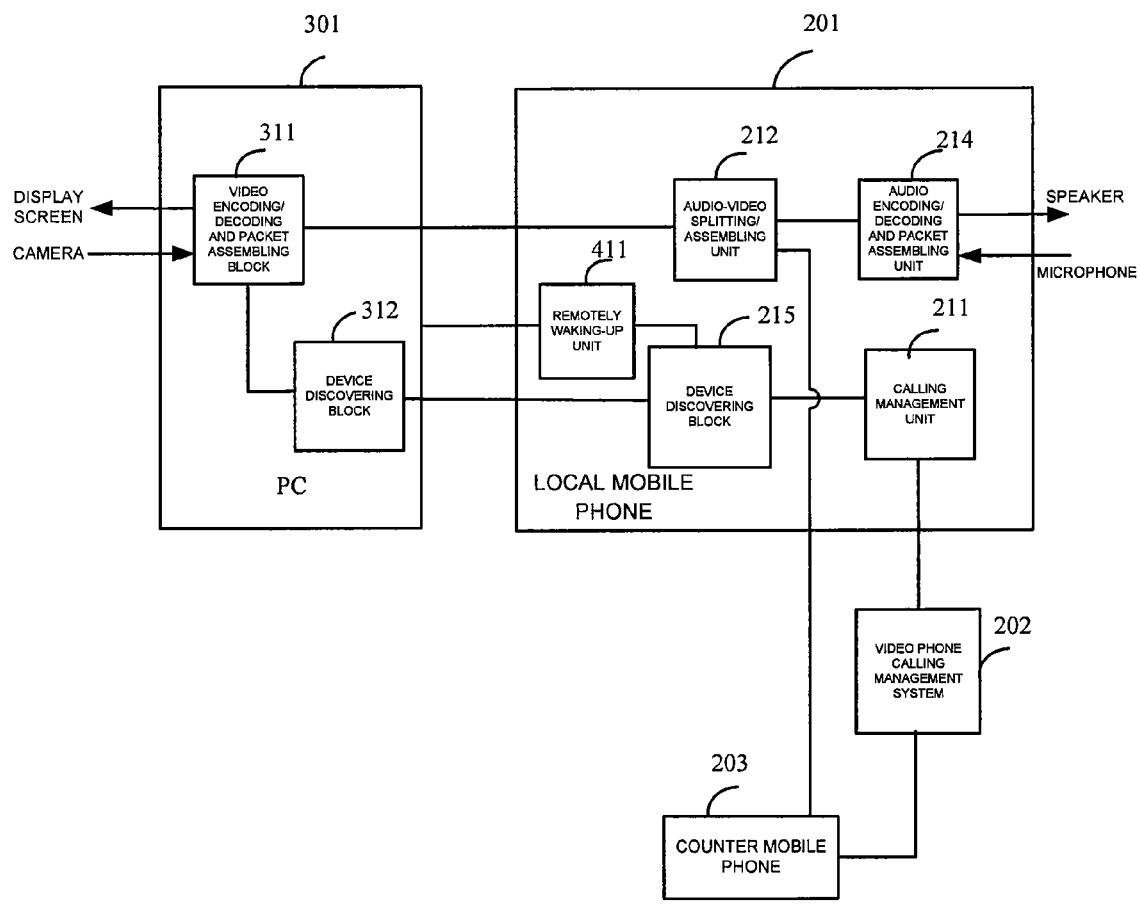
FIG. 4 is a systematic diagram of the terminal according to a second embodiment of the present invention.

Referring to FIG. 4, a remotely waking-up unit 411 is added into the local mobile phone 201 on the basis of FIG. 3. If the device discovering unit 215 has successfully found the PC 302, whereas the audio-video splitting/assembling unit 212 hasn't been in the communication with the PC 302, the local mobile phone 201 uses the remotely waking-up technology to remotely wake up the PC 302. After being turned on, the PC 302 performs rapid startup, and works in with the local mobile phone 201 to perform the video transfer function.

The remotely waking-up technology may adopt the Always on wireless remotely waking-up technology, commonly used to wake up the notebook PC; or it may use the remotely waking-up technology on the wire network, commonly used to wake up the desktop computer.

By means of the remotely waking-up technology, it is ensured that the video transferring function can be implemented even if the PC 302 is turned off.

Figure 5:
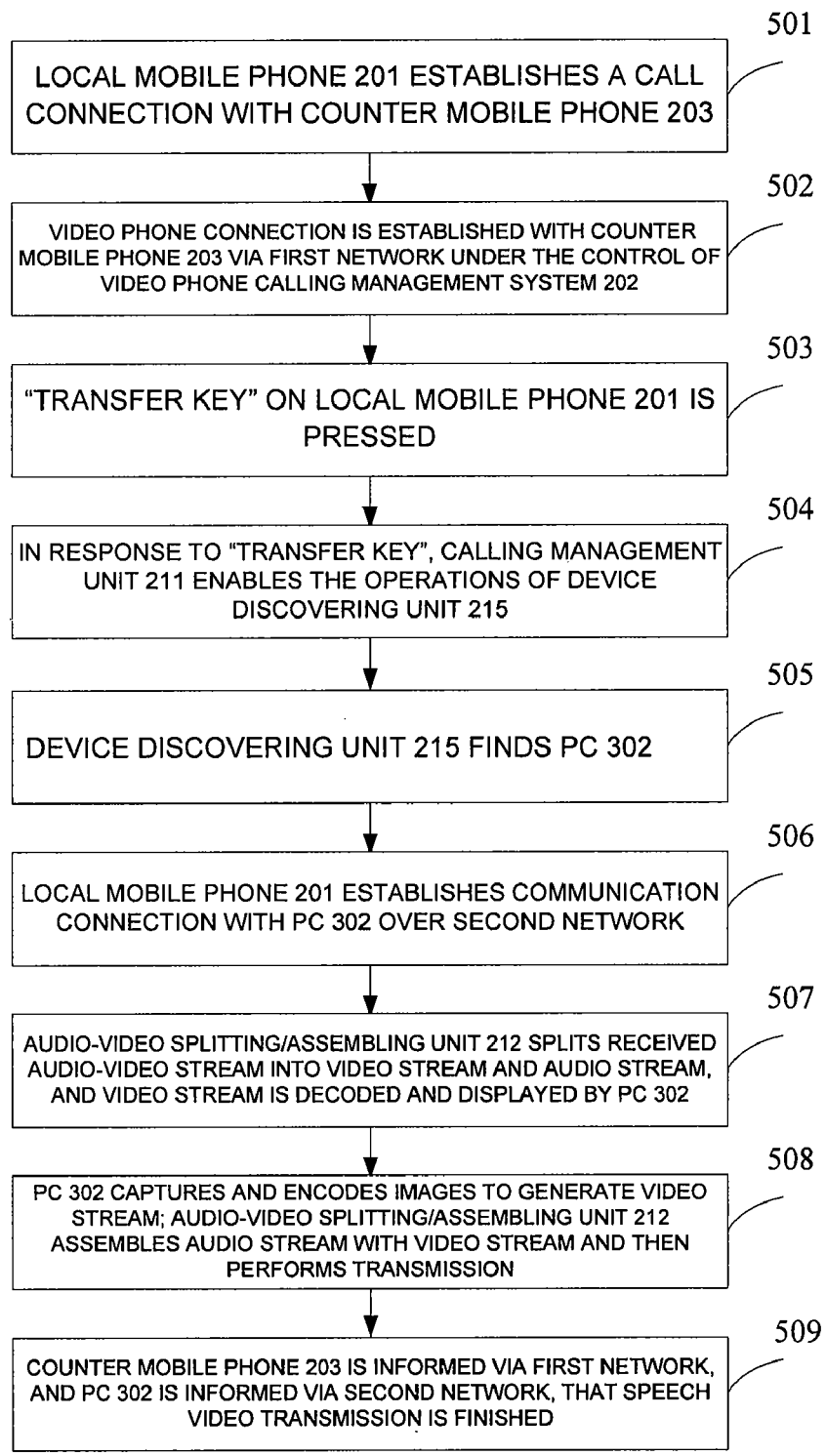
FIG. 5 is a flow chart of the method for transferring video according to the present invention.

In the following, the video transferring method provided by the present invention will be described in detail in conjunction with the drawings:

Referring to FIG. 5, it shows a flow chart for implementing the video transfer method in FIG. 3. The method comprises:

Step 501: the local mobile phone 201 establishes a calling connection with the counter mobile phone 203;

The establishment of the calling connection comprises:

Called: the local mobile phone 201 receives the video phone calling from the counter mobile phone 203, and then is normally picked up;

Calling: the local mobile phone 201 normally dials up the counter mobile phone 203.

Step 502: the local mobile phone 201 controls the establishment of the connection with the counter mobile phone 203 via the video phone calling management system 202 over the first network;

Step 503: the "transfer key" on the local mobile phone 201 is pressed,

In which the transfer key is a key for implementing the setting of the video transfer function, after pressing the key, the video transfer function is enabled.

Step 504: the calling management unit 211 enables the operations of the device discovering unit 215 in response to "the transfer key";

Step 505: the device discovering unit 215 finds the PC 302;

Step 506: the local mobile phone 201 establishes the communication connection with the PC 302 over the second network;

In which, if the PC 302 has been found, whereas a connection can not be normally established, it means that the PC 302 is not turned on, at this time, it is possible to use the remotely waking-up unit 411 to wake up the PC 302.

Step 507: the audio-video splitting/assembling unit 212 of the local mobile phone 201 receives the audio-video stream from the counter mobile phone 203, and then splits it into the video stream and audio stream:

The video stream is sent to the video encoding/decoding and packet assembling block 311, after being decoded into the images, the PC 302 displays it to the user;

The audio stream is sent to the audio encoding/decoding and packet assembling unit 214, after being decoded into the sound, it is transmitted to the user;

Step 508: the video encoding/decoding and packet assembling block 311 encodes the captured images to generate the video stream, and then sends it to the audio-video splitting/assembling unit 212;

The audio encoding/decoding and packet assembling unit 214 encodes the obtained sound to generate the audio stream, and then sends it to the audio-video splitting/assembling unit 212;

The audio-video splitting/assembling unit 212 assembles the video stream with the audio stream, and then sends it to the counter mobile phone 203;

At the steps 507 and 508, the audio-video transmitted/received to/from the counter mobile phone 203 is transmitted over the first network; the video stream transmission with the PC 302 is performed over the second network.

Step 509: after completing the conversation, the local mobile phone 201 informs the counter mobile phone 203 over the first network and informs the PC 302, to finish the audio-video transmission.

Figure 6:
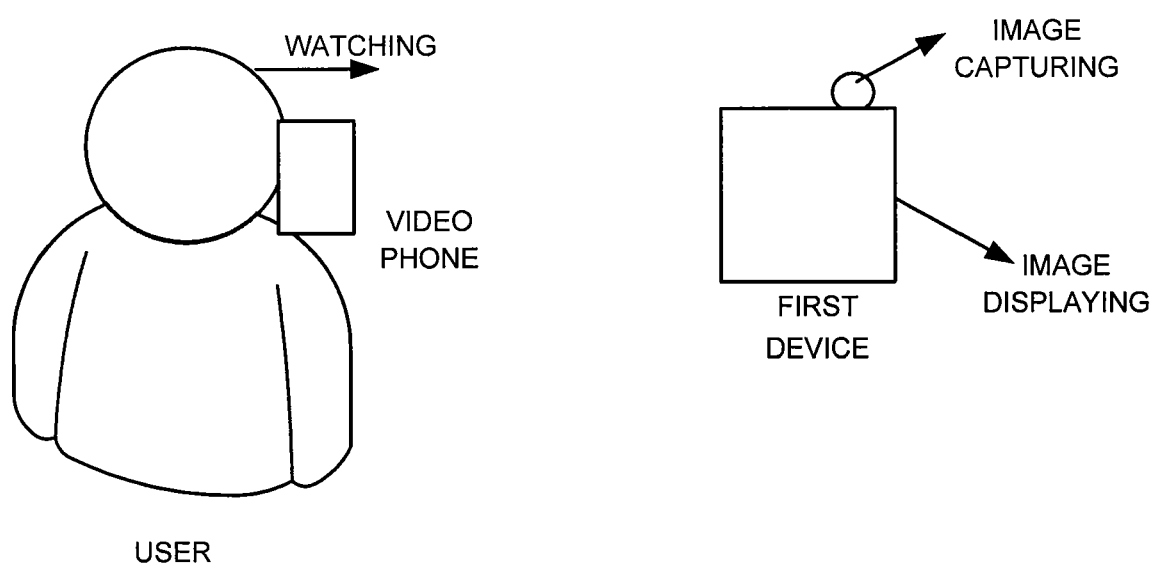
FIG. 6 is a schematic diagram of the usage of the terminal according to the present invention.

Referring to FIG. 6, it shows the schematic diagram of the usage of the terminal according to the present invention.

It is possible to obtain the counter-party's image by watching the PC's screen, generally speaking, in comparison with the conventional manner in FIG. 1, the PC has larger screen and can obtain better visual effect, and the images will no longer suffer the limitation of the size of the video phone's screen.

Meanwhile, it is not required to use the earphones to carry out the sound transmission, and the current conventional manner is still employed in which the mobile phone is hand-held near the ears, which is very convenient.

Furthermore, capturing the user's image by means of the image capture function of the first device will no longer suffer the limitation of the pixel resolution or location of the video terminal's camera, and thus more definite pictures can be provided for the counter-party.

Moreover, the terminal video transfer mode provided by the present invention may be conveniently compatible with the conventional mode without any modifications on the counter-terminal, which is very practical.

It should be noted that, for the clarity of illustration, the above has just described the detailed embodiments by taking the video phone as an example. However, for the other video terminals, such as PDA devices, handheld computers and the like, the embodiments are similar. In the similar way, the above description takes a PC as the first device. However, for the other first device, such as the digital TVs with the image capturing function, the digital video cameras and the like, the embodiments are also similar, which will not be described in detail herein.

The foregoing description gives only the preferred embodiments of the present invention and it should be noted that those skilled in the art will be capable of making many modifications and improvements, which should be also encompassed by the scope of the present invention.

What is claimed is:

1. A terminal for transferring video, comprising:
an audio-video splitting/assembling unit for assembling locally acquired video stream and audio stream, or splitting an audio-video assembly sent by a counter-terminal into video stream and audio stream;
wherein it further comprises:
a device discovering unit responsible for searching for a first device with image capturing and displaying functions, and
an audio encoding/decoding and packet assembling unit for performing audio stream transmission with the audio-video splitting/assembling unit, and a remotely waking-up unit responsible for waking-up the first device, when the device discovering unit has found the first device but the audio-video splitting/assembling unit cannot establish a connection to the first device,
wherein the audio-video splitting/assembling unit is adapted to receive a video stream captured by the first device after the device discovering unit has found the first device, and then to use the video stream for the local audio-video assembly, or the audio-video splitting/assembling unit is adapted to send the split video stream to the first device for display,
the audio-video splitting/assembling unit obtains the video stream of the first device and the audio stream generated by the audio encoding/decoding and packet assembling unit through encoding sound acquired from a microphone of the terminal, assembles the video stream with the audio stream, and sends it to the counter-terminal, or, splits the audio-video stream sent from the counter-terminal, and then sends the video stream and the audio stream to the first device and the audio encoding/decoding packet assembling unit respectively, the audio encoding/decoding packet assembling unit decoding the audio stream and then transmitting it to a user's ears through a speaker of the local terminal.

2. The terminal according to claim 1, further comprising:
a calling management unit responsible for establishing a communication connection between the terminal and the counter-terminal, and also responsible for starting up the action of the device discovering unit.

3. The terminal according to claim 2, wherein the first device is adapted
to decode the video stream sent from the audio-video splitting/assembling unit, and to display the video stream; or to packet assemble the obtained image to generate the video stream, and then send it to the audio-video splitting/assembling unit.

4. The terminal according to any one of claims 1, 2, and 3, wherein the terminal includes video phone, personal digital assistant or handheld computer.

5. The terminal according to any one of claims 1, 2, and 3, wherein the first device is an independent device or an assembled device, including a computer with a digital camera, a digital TV with image capturing function or a digital video camera.

6. A method for transferring video, used in video communication between a local terminal and a counter-terminal, comprising:
searching for a first device with image capturing and displaying functions; waking-up the first device according to a remotely waking up technology; and
receiving a local video stream of images obtained by the first device, and assembling the video stream with a pre-obtained audio stream for transmitting it to the counter-terminal, wherein the pre-obtained audio stream is generated through encoding sound acquired from a microphone of the local terminal, or
splitting an audio-video stream sent from the counter-terminal, and then transmitting the split video stream to the first device for image display and transmitting the split audio stream to the local terminal, wherein the audio stream is decoded and transmitted to a user's ears through a speaker of the local terminal.

7. The method according to claim 6, wherein the remotely waking-up technology is a wireless or wire remotely waking-up technology.

8. The method according to any one of claims 6 and 7, wherein the searching for the first device is done by Intelligent Grouping and Resource Sharing (IGRS), Universal Plug and Play (UPNP) or Digital Living Network Alliance (DLAN) protocol.

9. The method according to any one of claims 6 and 7, wherein the communication between the local terminal and the first device is implemented over a short distance wireless network or a wire connection.

10. The method according to claim 9, wherein
the short distance wireless network is a Ultra-Wide Bandwidth (UWB) wireless network, a Wireless Fidelity (WiFi) network, a ZIGBee network or a Bluetooth™ network; and
the wire connection is a Universal Serial Bus connection or an IEEE1394 connection.

* * * * *